United States Patent Office 3,170,962
Patented Feb. 23, 1965

3,170,962
ORGANOSILICON-EPOXY RESIN COMPOSITIONS
Leslie J. Tyler, Midland, Mich., assignor to Dow Corning Corporation, Midland, Mich., a corporation of Michigan
No Drawing. Filed Jan. 14, 1955, Ser. No. 481,967
2 Claims. (Cl. 260—824)

This invention relates to new resinous compositions which are cocondensates of certain silicon containing compositions and epoxide resins.

It is the object of this invention to provide novel resinous materials which posses excellent heat stability, chemical resistance, and have superior non-chalking characteristics when employed in surface coatings. A further object is to provide resinous coatings for a wide variety of metallic and non-metallic surfaces. Another object is to provide a novel electrical insulation for wire, i.e., a magnet wire enamel. A further object is to provide a silicone-epoxide resin containing epoxy groups

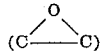

Other objects and advantages obtained through this invention are detailed in or will be apparent from the specification and appended claims which follow.

In accordance with this invention a novel resinous composition is prepared consisting essentially of the reaction product of: (A) from 1 to 99 percent by weight based on the total weight of (A) and (B) of a resinous epoxide prepared by reacting (1) a polyhydric phenol with (2) a compound selected from the group consisting of polyfunctional chlorohydrins and polyepoxides and mixtures thereof, said epoxide resin containing at least one OH group per molecule; and (B) from 1 to 99 percent by weight based on the total weight of (A) and (B) of an organosilicon compound having the formula

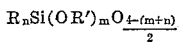

wherein $n$ has an average value of from .9 to 3, $m$ has an average value of from .05 to 3.1, the sum of $m+n$ cannot exceed 4, R is a radical selected from the group consisting of monovalent hydrocarbon radicals and halogenated monovalent hydrocarbon radicals and R' is selected from the group consisting of hydrogen atoms and aliphatic hydrocarbon radicals.

The epoxide resins which are operative in this invention are known materials and are produced by the reaction of polyhydric phenols with either polyfunctional halohydrins or polyepoxides or mixtures thereof to form complex reaction products containing terminal epoxide

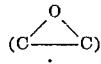

groups. These epoxide resins contain an average of at least about one hydroxyl group per molecule.

The polyhydric phenols used in making the epoxide resins employed herein include any of the phenols containing two or more phenolic hydroxyl groups which can be in one nucleus as in resorcinol or in different nuclei of fused ring systems as in 1,5-dihydroxy naphthalene, or in different nuclei of ring systems attached by chains composed of one or more atoms, in which case the chains should be free from elements which interfere with the reaction of the poly-epoxides with the phenolic hydroxyl groups. The phenolic nuclei and/or the chains linking phenolic nuclei can contain substitutes providing they do not interfere with the desired reaction of the polyepoxide with the phenolic hydroxyl groups. Illustrative of polyhydric phenols which can be used in making the complex epoxide resin polymers are mono-nuclear phenols such as resorcinol, hydroquinone, catechol and phloroglucinol, and polynuclear phenols such as bis-phenol-(p,p'-dihydroxy diphenyl dimethyl methane), p,p'-dihydroxy benzophenone, p,p'-dihydroxy diphenyl, p,p'-diyhdroxy dibenzyl, bis-4-hydroxy phenyl)sulfone, 2,2'-dihydroxy 1,1'-dinaphthyl methane, polyhydroxy naphthalenes, and anthracenes, o,p,o',p'-tetrahydroxy diphenyl dimethyl methane and other dihydroxy or polyhydroxy diphenyl or dinaphthyl methanes, etc.

Also operative in this invention are polyhydric phenols which are condensation products of simpler polyhydric phenols with dichlorides such as dichlorodiethyl ether and dichlorobutene and are assumed to have one of the following general formulae:

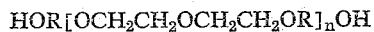

and/or

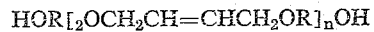

wherein R is the residue from the phenol and $n$ is at least 1. These polymeric condensation products consist of the dihydric phenol residues united or joined by and through the residues from the organic dichlorides.

A special case of interest and operative herein involves the condensation of complex polyhydric phenols with dibasic acids. For example, the condensation of adipic acid with a polyhydric phenol produces a polymer of the general formula

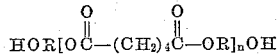

in which R is the residue from the phenol and $n$ is at least 1.

One of the best known and preferred of the polyhydric phenols operative herein is bis-phenol(p,p'-diyhdroxy diphenyl dimethyl methane).

The polyepoxides which are operative herein as reactants with the polyhydric phenols contain two or more epoxide groups. The simplest diepoxides contain at least 4 carbon atoms such as 1,2 epoxy-3,4 epoxy butane. The epoxy groups can be separated from each other by ether groups or linkages as in the case of bis-(2,3 epoxy propyl)ether and bis-(2,3 epoxy 2-methyl propyl)ether. Also operative herein are the more complex polyepoxides such as those prepared by reacting 2 or more mols of a diepoxide with 1 mol of dihydric phenol, or 3 or more mols of a diepoxide with 1 mol of trihydric phenol, etc. Polyepoxides derived from polyhydric alcohols such as mannitol, sorbitol, erythritol or polyallyl alcohol can also be used. The polyepoxy compounds used herein can have varying structures and can be of complex structure so long as they do not contain groups which interfere with the reaction between the epoxide groups and the phenolic hydroxyl groups. The polyepoxide reactants employed herein should be substantially free from reactive groups other than epoxide and aliphatic hydroxyl groups.

Simple diepoxides of a high degree of purity can be prepared and obtained by fractional distillation to separate them from byproducts formed during their manufacture. For example, bis-(2,3-epoxy propyl)ether or diglycid ether can be produced and separated by fractional distillation to give products of high purity. More complex polyepoxides of higher molecular weight are generally difficult to isolate by fractional distillation, but they can be employed herein after purification to remove objectionable inorganic impurities and catalysts such as caustic alkali. The high molecular weight diepoxide or polyepoxide with admixed byproducts such as monoepoxides is operative herein. Particularly well known and useful herein are the reaction products of, for example, epichlorohydrin with a polyhydric alcohol. A specific example of this reaction involves 1 mol of a trihydric alcohol reacted with 3 mols of epichlorohydrin and a catalyst. The epoxide group of the epichlorohydrin reacts with a hydroxyl group of the alcohol and subsequent treatment removes chlorine from the reaction product thus producing the desired polyepoxide. Such polyepoxides can contain less than 3 epoxy groups per molecule even though 3 mols of epichlorohydrin are reacted with 1 mol of a trihydric alcohol. Complex side reactions apparently take place with the resulting production of other compositions containing free hydroxyl groups or cyclic ring compounds or polymeric compounds which can be present in the resulting product. Nevertheless, such products can be employed as polyepoxides for reaction with polyhydric phenols to form the resinous epoxides of this invention.

As noted supra, the polyepoxides can contain varying small amounts of admixed monoepoxides. To the extent that monoepoxides are present they will react with the polyhydric phenols to form terminal groups or residues containing hydroxyl groups and to the extent that such terminal hydroxyl groups are present the complex polyepoxide compositions will contain complex epoxyhydroxyl compounds containing both terminal epoxide containing residues and terminal hydroxyl containing residues. The presence of monoepoxides or of monoepoxy-hydroxyl compounds does not interfere with the desired reaction provided a sufficient amount of polyepoxides is present to serve as polyfunctional reactants with polyhydric phenols.

The reaction conditions and proportions of reactants to be employed and obvious variations of the reaction as well as alternative reactions are set forth in full detail in United States Patent 2,592,560 issued April 15, 1952.

Alternatively, the polyhydric phenol can be reacted with a polyfunctional chlorohydrin such as monochlorohydrins for example epichlorohydrin, dichlorohydrins, for example, glycerol dichlorohydrin, bis-(3-chloro, 2-hydroxy propyl)ether, 1,4-dichloro-2,3-dihydroxy butane, 2-methyl-2-hydroxy-1,3-dichloropropane, bis - (3 - chloro, 2-methyl, 2-hydroxy propyl)ether, and other mono and dichlorohydrins derived from aliphatic olefins, mannitol, sorbitol and other alcohols. In short the term "polyfunctional chlorohydrin" as employed herein includes all compounds which contain at least one epoxide and at least one chlorine atom in the molecule and all compounds containing a chlorine atom and an OH group on adjacent carbon atoms and at least one other chlorine atom in the molecule. It is preferred that the chlorohydrin be substantially free of other functional groups. Epichlorohydrin and/or glycerol dichlorohydrin are particularly useful in this invention.

The proportions of reactants as well as reaction conditions and variations and alternative procedures involved in the polyhydric phenol-polyfunctional chlorohydrin reaction are well known and are set forth in detail in U.S. Patents 2,615,007 and 2,615,008.

The organosilicon compounds operable in this invention have an average of from .9 to 3 inclusive monovalent hydrocarbon radicals and/or halognated monovalent hydrocarbon radicals attached to the silicon by C-Si bonds. Also attached to the silicon atoms are from .05 to 3.1 inclusive hydroxy and/or aliphatic hydrocarbonoxy radicals. The organosilicon compounds can be monomeric silanes, hydrolyxated and/or aliphatic hydrocarbon oxylated homopolymeric, and/or copolymeric siloxanes, and organosilanols or mixtures thereof. The organic substituents can be any monovalent hydrocarbon radical, for example, alkyl radicals such as methyl, ethyl, butyl and octadecyl; alkenyl radicals such as vinyl and allyl; aryl radicals such as phenyl, naphthyl and xenyl; alicyclic radicals such as cyclopentyl and cyclohexyl; alkaryl radicals such as tolyl and xylyl; and aralkyl radicals such as benzyl, and/or any halogenated monovalent hydrocarbon radical such as tetrafluoroethyl, perfluorovinyl, dichlorophenyl, $\alpha,\alpha,\alpha$-trifluorotolyl and so forth. The aliphatic hydrocarbonoxy radicals attached to the silicon can be any saturated or unsaturated aliphatic hydrocarbon radical attached through oxygen by C-O-Si linkage to the silicon such as methyl, ethyl, octadecyl, vinyl, allyl, benzyl and cycloaliphatic radicals such as cyclopentane and cyclohexane.

The organosilicon compounds of this invention are well known in the art and methods of preparation are exceedingly well known and documented.

The method of preparation of the cocondensates of silicon containing compositions and epoxide resins of this invention is not critical. The reaction involved is simply a condensation reaction which can be brought about by heating the reactants to split out either an alcohol or water via reaction between the silicon OR' group and the OH groups in the epoxide resin. The reactants can be added to the reaction zone in one batch or stepwise.

Modification of the organosilicon-epoxide resins can be accomplished with any carboxylic acid, or equivalent anhydride or ester without departing from the scope of this invention. The epoxide resin starting material can be first modified by esterification with any fatty acid or any equivalent anhydride by merely heating and removing the water so produced. The resulting epoxide resin ester can then be reacted with the organisilicon compound as already detailed. Alternatively, the organosilicon compound, epoxide resin, and carboxylic acid or equivalent can be cooked together in a single step reaction to produce the desired epoxide-ester-organosilicon resinous composition. Operative in such reactions are any drying and/or non-drying carboxylic acid or equivalent anhydride and/or ester such as caprylic, lauric, myristic, stearic, oleic, linoleic, linolenic, arachidonic, and elaeostearic and mixtures thereof. These acids are derived from such oils as castor oil, coconut oil, linseed oil, tung oil and the like.

The epoxide resin and organosilicon compound can be reacted in any proportions from 1 to 99 percent by weight of resin and from 1 to 99 percent by weight of the organosilicon composition.

A wide variety of well-known melamine and/or urea resins can be blended with the resins of this invention to obtain desired characteristics. The materials employed and the proportions used will be entirely dependent upon the ultimate properties sought and will be readily apparent to one skilled in the art.

The various resin compositions disclosed herein can be cured in any desired manner without departing from the scope of this invention. The best method of cure is to heat the epoxide-siloxane resin compositions with small amounts of polyfunctional amines such as ethylene diamine, ethylene triamine, etc. The final cure is produced by reaction of the amine with residual epoxy groups.

The resins of this invention have many uses including coating metals and other surfaces, insulation coatings on glass served wire, adhesives, bonding laminates, and for sheet insulation.

The examples which follow will serve to aid those skilled in the art to better understand this invention. These examples are illustrative and are not to be construed as in any way restricting this invention. All parts and percentages in the examples are based on weight unless otherwise specified.

*Example 1*

650 grams of an epoxide resin having the general formula

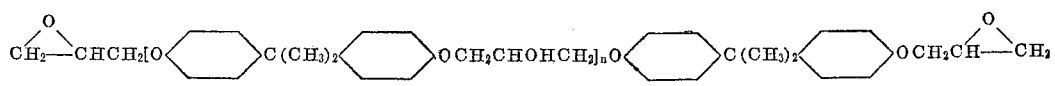

having a melting point of 64–76° C., having an epoxide equivalent of 450–525 (epoxide equivalent is the number of grams of resin containing one gram equivalent of epoxide), a refractive index at 25° C. of 1.595, a hydroxyl equivalent weight of 130 (i.e., 130 grams of this resin will completely esterify one gram-mole of monobasic acid, e.g. 60 grams of acetic acid), and 580 grams of a partially hydrolyzed diphenyldimethoxysilane containing 21.6 percent methoxy groups were charged to a flask. The mixture was slowly heated with concurrent stirring to 153° C. 45 ml. of volatile material was removed. The reactants were at first incompatible but became compatible with heating and a single phase reaction product resulted. A clear viscous resin was obtained and was tested and found to be excellent as an adhesive particularly for bonding copper to various molding resins and as a surface coating material. The resin could be readily cast and cured with catalytic amounts of amines. 30 grams of resin were admixed with .9 grams of ethylene diamine and the mixture was oven cured for 4 hours at 100° C. to produce a hard, tough casting which did not craze, crack or bubble when heated to 250° C. for three days.

Example 2

100 parts of the epoxide resin described in Example 1 were charged to a flask and 300 parts of a hydrolyzed organopolysiloxane composed of 45 mol percent phenylmethylsiloxane units, 25 mol percent methylsiloxane units, 20 mol percent phenylsiloxane units and 10 mol percent diphenylsiloxane units and containing 4 percent residual hydroxyl groups, were added in the form of a 54.6 percent solids in xylene solution. The mixture was heated with constant agitation to 186° C. in a half hour. Some of the solvent came off during this initial heating procedure. The mixture was gradually cooled to 150° C. over the next half-hour and again heated to 189° C. during the succeeding hour, at which point the originally incompatible reactants had become completely compatible and formed a single phase reaction mixture. The temperature was reduced to 150° C. over the next one hour and held at 150° C. for 3 hours. At the end of this time, the resin bodied and was diluted to 50 percent solids in xylene and filtered. The resin filtrate was clear. A 1.9 mil thick film of this resin was cured at 150° C. in less than 1 hour. A hard, tough, rigid film was produced which had an excellent craze life at 250° C. and was suitable for coating on glass served wire or glass cloth.

Example 3

300 parts of the epoxide resin of Example 1 and 100 parts of a hydrolyzed organopolysiloxane composed of 30 mol percent phenylmethylsiloxane units, 32 mol percent methylsiloxane units, 32 mol percent phenylsiloxane units and 6 mol percent diphenylsiloxane units and containing 3 to 4 percent residual hydroxyl groups, were added to a flask. 90 parts toluene and 200 parts anisole were added as solvents. The reactants were incompatible before heating started. The flask was heated to 126° C. in 30 minutes and to 145° C. in the next hour. The reaction mixture was refluxed and 22 parts toluene removed during this period. Heating at 145° C. was continued for about 2 hours at which point the resin bodied. During the heating, the reactants gradually became compatible and formed a single phase reaction mixture. 132 parts of diacetone alcohol were added to the cooled reaction mixture to give 50 percent solids in solution. The resin solution was filtered and a clear filtrate obtained. A film of this resin 2 mils thick was cured at 150° C. in less than 1 hour. It produced a hard, tough, rigid film having good thermal stability at 250° C. This resin was suitable for coating on glass-served wire.

Example 4

Equivalent results are obtained when the reaction product of resorcinol (m-dihydroxybenzene) and 1,2 epoxy-3,4 epoxy butane is substituted for the epoxide resin of Example 3, and α,α,α-trifluorotolyl methyl siloxane containing 3–5 percent residual hydroxyl groups is substituted for the siloxane resin of Example 3.

Example 5

Equivalent results are obtained when phenylvinyldibutoxysilane is substituted for the diphenyldimethoxysilane of Example 1, and the reaction product of bis phenol-(p,p′-dihydroxydiphenyldimethyl methane) and glycerol dichlorohydrin is substituted for the epoxide resin of Example 1.

That which is claimed is:

1. A composition of matter composed of the reaction product of: (A) a resinous epoxide prepared by the reaction of (1) a polyhydric phenol and (2) a compound selected from the group consisting of polyfunctional chlorohydrins and polyepoxides and mixtures thereof, said epoxide resin having an average of at least one OH per molecule, and (B) a silicone compound having more than one hydroxyl group attached directly to one or more silicon atoms and being free from functional groups other than hydroxy, alkoxy, and aroxy.

2. A composition of matter composed of the reaction product of: (A) a resinous epoxide prepared by the reaction of (1) a polyhydric phenol and (2) a compound selected from the group consisting of polyfunctional chlorohydrins and polyepoxides and mixtures thereof, said epoxide resin having an average of at least one OH per molecule, and (B) with both (3) a hydroxy silicone having an OH directly attached to a silicon atom and being free from functional groups other than OH, and (4) a silicone ester having a hydrocarbon radical attached to a silicon atom through an oxygen atom and being free from functional groups other than alkoxy and aroxy.

References Cited by the Examiner
UNITED STATES PATENTS

| | | | |
|---|---|---|---|
| 2,687,398 | 8/54 | McLean | 260—42 |
| 2,695,276 | 11/54 | Hatcher | 260—42 |
| 2,768,150 | 10/56 | Millar et al. | 260—42 |
| 2,843,560 | 7/58 | Mika | 260—42 |

LEON J. BERCOVITZ, *Primary Examiner.*

M. STERMAN, D. ARNOLD, DONALD E. CZAJA,
*Examiners.*

UNITED STATES PATENT OFFICE
CERTIFICATE OF CORRECTION

Patent No. 3,170,962            February 23, 1965

Leslie J. Tyler

It is hereby certified that error appears in the above numbered patent requiring correction and that the said Letters Patent should read as corrected below.

Column 2, line 17, the formula should appear as shown below instead of as in the patent:

$$HOR[OCH_2CH=CHCH_2OR]_nOH$$

Signed and sealed this 10th day of August 1965.

(SEAL)
Attest:

ERNEST W. SWIDER            EDWARD J. BRENNER
Attesting Officer            Commissioner of Patents